(12) United States Patent
Kikuchi et al.

(10) Patent No.: US 11,515,077 B2
(45) Date of Patent: Nov. 29, 2022

(54) POWER MAGNETIC COMPONENTS PACKAGED IN OTHERWISE UNUTILIZED SPACE OF POWER ELECTRONICS

(71) Applicant: Ford Global Technologies, LLC, Dearborn, MI (US)

(72) Inventors: Jun Kikuchi, Novi, MI (US); Chuanbing Rong, Canton, MI (US); Leyi Zhu, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 507 days.

(21) Appl. No.: 16/736,275

(22) Filed: Jan. 7, 2020

(65) Prior Publication Data
US 2021/0210277 A1    Jul. 8, 2021

(51) Int. Cl.
| | | |
|---|---|---|
| H01F 27/30 | (2006.01) | |
| H01F 7/04 | (2006.01) | |
| H01F 1/44 | (2006.01) | |
| H01F 27/24 | (2006.01) | |
| H01F 27/02 | (2006.01) | |
| H01F 1/147 | (2006.01) | |
| H02M 3/04 | (2006.01) | |
| H02M 7/00 | (2006.01) | |
| H01B 7/04 | (2006.01) | |

(52) U.S. Cl.
CPC ............ *H01F 27/306* (2013.01); *H01B 7/04* (2013.01); *H01F 1/147* (2013.01); *H01F 1/447* (2013.01); *H01F 27/022* (2013.01); *H01F 27/24* (2013.01); *H02M 3/04* (2013.01); *H02M 7/003* (2013.01)

(58) Field of Classification Search
None
See application file for complete search history.

(56) References Cited

U.S. PATENT DOCUMENTS

| | | |
|---|---|---|
| 2,949,591 A | 8/1960 | Craige |
| 8,653,924 B2 | 2/2014 | Kobayashi et al. |
| 2014/0266539 A1* | 9/2014 | Krishnamoorthy ..... H01F 27/29 336/221 |
| 2018/0211769 A1* | 7/2018 | Qiao ....................... H02M 5/16 |
| 2018/0294093 A1* | 10/2018 | Rinkleff ............... H03H 7/1741 |
| 2019/0134417 A1* | 5/2019 | Tong ..................... A61N 2/006 |

FOREIGN PATENT DOCUMENTS

GB           565228 A        5/1943

* cited by examiner

*Primary Examiner* — Jared Fureman
*Assistant Examiner* — Aqeel H Bukhari
(74) *Attorney, Agent, or Firm* — David B. Kelley; Brooks Kushman P.C.

(57) ABSTRACT

A power system has a power-electronic module that includes a housing defining a looped reservoir, a ferro-magnetic medium sealed within and filling the looped reservoir, and a conductor surrounded by the ferro-magnetic medium. The conductor is coiled within and along the looped reservoir, and has terminals extending out of the reservoir such that the ferro-magnetic medium and conductor form an inductor that opposes changes in magnitude of current flowing through the conductor.

19 Claims, 4 Drawing Sheets

POWER MAGNETIC COMPONENTS PACKAGED IN OTHERWISE UNUTILIZED SPACE OF POWER ELECTRONICS

TECHNICAL FIELD

This disclosure relates to automotive power electronics systems and the arrangement of power magnetic components therein.

BACKGROUND

In power electronics, power magnetic components such as inductors and transformers are passive components used to store and release magnetic energy in concert with power-semiconductor device switching action. Power magnetic components generally include electrically conductive windings made of copper or aluminum, a magnetic core made of soft-magnetic material such as ferrite, iron-silicon, laminated iron, etc., and items for mechanical support, cooling, and connection to external circuitry. Such designs can thus occupy significant space within power electronic converters.

SUMMARY

A power system has a power-electronic module including a housing defining a looped reservoir, a ferro-magnetic medium sealed within and filling the looped reservoir, and a conductor surrounded by the Imo-magnetic medium, coiled within and along the looped reservoir, and having terminals extending Out of the reservoir such that the Cerro-magnetic medium and conductor form an inductor that opposes changes in magnitude of current flowing through the conductor.

A power system has a power-electronic module including a housing, switches contained by and spaced away from the housing, and a serpentine polymer cord strung within the housing and around the switches. The polymer cord includes a ferro-magnetic medium distributed throughout and a pair of conductors passing therethrough such that the ferro-magnetic medium and conductors form an inductor that opposes changes in magnitude of current flowing through the conductors.

A power system has a power-electronic module including a housing, switches contained by and spaced away from the housing, and a necklace strung within the housing and around the switches. The necklace includes a plurality of discrete bead-core elements having bores therethrough and one or more conductors passing through the bores to form an inductor that opposes changes in magnitude of current flowing through the conductors.

DETAILED DESCRIPTION

Figure 1A:
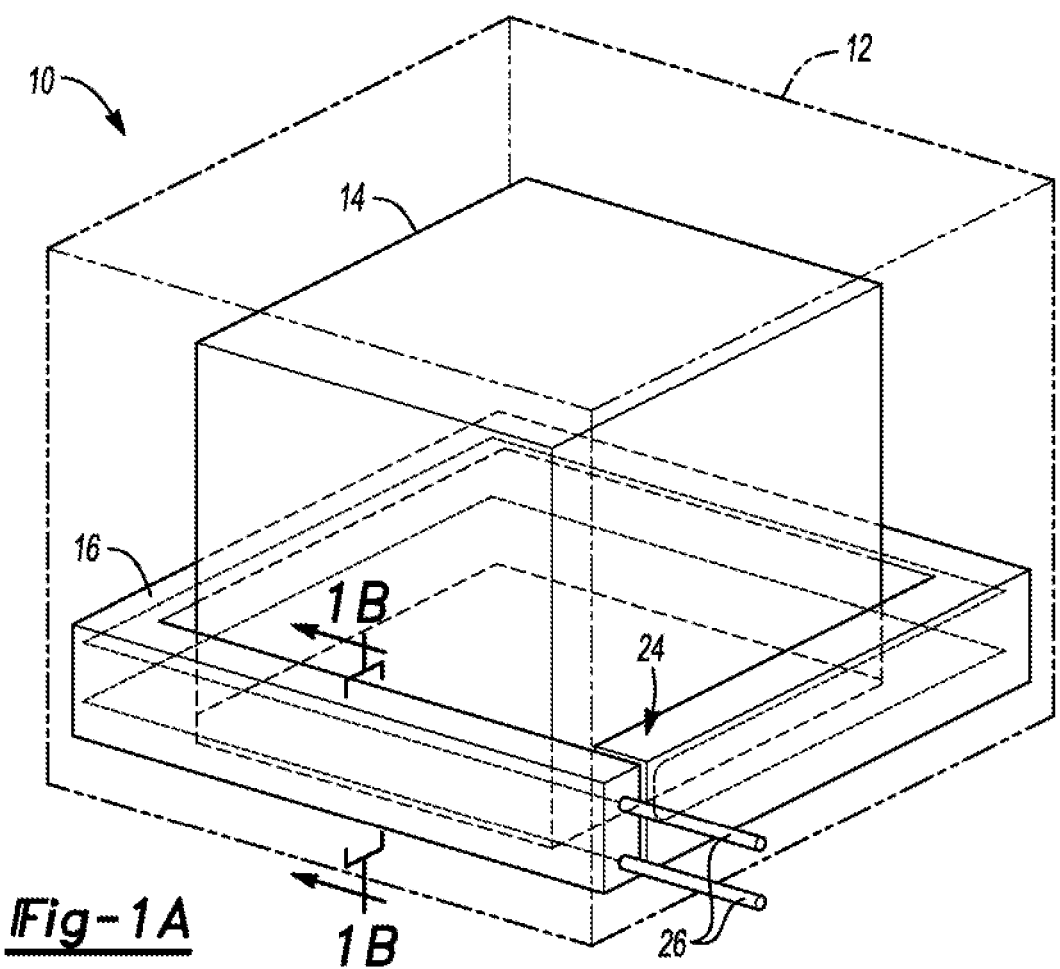
FIG. 1A is a schematic diagram of an automotive power-electronic module.

Various embodiments of the present disclosure are described herein. However, the disclosed embodiments are merely exemplary and other embodiments may take various and alternative forms that are not explicitly illustrated or described. The figures are not necessarily to scale; some features may be exaggerated or minimized to show details of particular components. Therefore, specific structural and functional details disclosed herein are not to be interpreted as limiting, but merely as a representative basis for teaching one of ordinary skill in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. However, various combinations and modifications of the features consistent with the teachings of this disclosure may be desired for particular applications or implementations.

Here, power magnetic components are proposed that can occupy usually unutilized-space so that the power electronic converter can be packaged in more a compact way with increased power density. This may be valuable for applications with limited available space, such as transportation power electronics.

As an example, the core of the inductive circuit may be ferro-magnetic. The core of the inductive circuit works to dampen current change in an electrical circuit. Damping the electrical current will simultaneously dampen magnetic flux change through the inductive circuit element. As the inductive circuit element's fuctionality is dependent upon changes in the magnetic field, varying cores composed of materials of differing permeability may have varying effects. For example, an inductive circuit element containing a core of a higher permeability may resist magnetic field change, and in turn store more magnetic energy than an inductive circuit dement containing a core of less permeability. The core may be constructed generally of non-ferromagnetic material. The non-ferromagnetic material may be doped with ferromagnetic medium. The ferromagnetic medium used to dope the non-ferromagnetic material may be iron or iron alloys, cobalt or cobalt alloys, neodymium or neodymium alloys, and other ferromagnetic materials. These materials may be provided in the form of foam, powder, gel, other fluids, and micro solids.

An inductive circuit element's functionality may also be affected by the dimensions of the core. In particular, the cross-sectional area of the core substantially perpendicular to the magnetic field lines may influence the functionality of the inductive circuit element. For example, an inductive circuit element may provide less inductance than an inductive element with a larger cross-sectional area.

The core of the inductive circuit element may be composed of varying degrees of hardness, flexibility, and state of matter.

Some embodiments use a soft metal for the core. The use of soft metal allows the core to bend while maintaining its state as one object. This may be important, as permanence of the core is better when the core is a single piece. Bending the core may allow the inductive circuit to be placed in generally inaccessible areas within a housing of the power electronics. For example, bending the core may allow the circuit to be placed in the corners of a power electronic module. Examples of materials suitable for soft metal cores are ferrite, iron-silicon, laminated iron, etc.

Other embodiments use a contained Ferro-liquid as the core. The use of the ferro-liquid provides the benefits of the flexibility as with the soil metal, with less concern for tearing of the ferrous material. The use of the liquid core may allow for even further access to inaccessible areas than solid cores, as the circuit may only be limited by the flexibility of the associated conductor.

The conductor of the inductive circuit may be comprised of conductive material. This conductor may be insulated to prevent electrical communication between the core and the conductor. In some embodiments, the conductors are composed of highly conductive and highly flexible materials. For example, the conductors may be copper.

One embodiment of the inductive circuit nay use flexible core materials. In these embodiments, a flexible core is used in which a conductor is disposed throughout.

In one embodiment of the flexible core circuit, the conductor disposed throughout the core is looped and returned in an antiparallel fashion. This configuration provides that when the conductor is energized, the flexible core is exposed to changing magnetic fields created by a current. passing in a positive direction as well as changing magnetic fields created by a current in a negative direction simultaneously. Since magnetic flux polarity is dependent upon direction of electrical current, inducing two magnetic flux fields from two relatively close anti-parallel electrical currents may effectively cancel the magnetic field effect. This configuration will also increase the inductance of the flexible core circuit.

In another embodiment of the flexible core circuit, the conductor may be shaped in a spiral or coiled manner. The flexible core may be disposed throughout the spiral shape. In this embodiment, the conductor may be composed of a flexible material. This flexible core may be composed of soft metal, ferro-liquid, or other ferro-magnetic materials. In some embodiments of the flexible inductor, the core may be comprised of a mixture of soft metals or ferro-magnetic solutions. In some embodiments, the core may be made of fluid like solids. For example, some embodiments may use ferro-magnetic powder as core material. Some embodiments may have a plurality of conductors or a looped conductor that is substantially parallel and shaped in a spiral or coiled manner. Embodiments having this structure will increase the electromagnetic communication between both the conductors as the differing directions of current may produce differing and conflicting magnetic fields, and between the conductors and the core.

Similar to previous embodiments of the flexible core circuit, the flexible inductor may contain wiring that is constructed as a counter-wound double helix. This conductor may be looped and returned. This provides changing magnetic fields that are relatively close and anti-parallel, essentially canceling the magnetic field effect.

One embodiment of the inductive circuit may be a flexible conductor circuit. The circuit may be composed of conductors and a plurality of cores. The plurality of cores may be composed of flexible or non-flexible materials.

One embodiment of the flexible conductor circuit may contain multiple cores. The cores of this embodiment may be disposed around the conductor. This provides an initial resistance to change in electrical current and magnetic fields in this section of the circuit local to the core, which is an increase to inductance. A second core may be disposed around the conductor in a different section of the conductor to further increase the inductance of the cable. Repeating this process may increase the inductance of the conductor to the desired effect. This structure is suitable to install in areas of a power box that are generally inaccessible as it only requires flexibility from the conductor. To increase functionality of the inductive cable, the cores may be sized to have a small axial length. Decreasing the length of the cores may lower the induction contribution of the core. This can be offset by increasing the number of cores installed in the cable. This may also be used to target a desired inductance.

The embodiments contemplated herein may be used in various power-electronic devices. For example, the embodiments may be used in transformers, converters, inverters, and other power-electronic devices. Use of the embodiments may provide impedance to a change in electrical magnitude through conductors to the device. For example, when the embodiments are used in a DC to DC converter, the embodiments may provide impedance to a change in electrical magnitude in the DC to DC conversion circuits via conductors in electromagnetic communication with both the embodiments and the DC to DC converter.

FIG. 1A shows an automotive power-electronic module 10 of an automotive power system. The power-electronic module 10 may be a DC to DC converter, an inverter, or the like. The power-electronic module 10 includes a non-ferromagnetic housing 12 (e.g., a plastic or epoxy housing), power electronic elements 14 such as switches, capacitors, etc., and a looped reservoir 16 that wraps around the power electronic elements 14.

The looped reservoir 16, in this example, is formed integral with the housing 12 and occupies corner portions thereof. The looped reservoir 16, however, may be located away from the corner portions or elsewhere within the housing 12 as the case may be. The housing 12 and looped reservoir 16 may thus be formed (cast, printed, etc.) as a single unitary component such that the housing 10 defines the looped reservoir 16. As discussed below however, the housing 10 and looped reservoir 16 may be separate components.

Figure 1B:
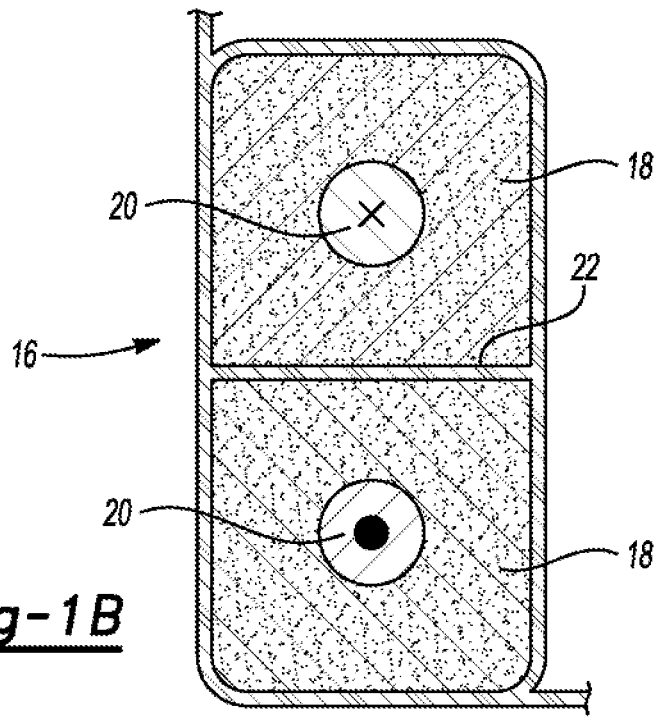
FIG. 1B is an enlarged portion, in cross-section, of a portion of the automotive power-electronic module of FIG. 1A.

Referring to FIGS. 1A and 1B, the looped reservoir 16 includes a ferro-magnetic medium 18 (e.g., a ferro-magnetic fluid, a ferro-magnetic foam, a ferro-magnetic gel, a ferro-magnetic powder, etc.) sealed therein and one or more conductors 20 (e.g., wires) surrounded by the ferro-magnetic medium 18. The looped reservoir 16, in this example, has a dual-chamber configuration such that a dividing wall 22 separates the conductor 20 as it folds back on itself. Single-chamber and multi-chamber configurations are also possible. In some examples, a housing may contain parallel cylindrical. sections, each of which contain a portion of the conductor that produces an electrical current and corresponding magnetic field, anti-parallel to other portions of the conductor.

The conductor 20 is coiled within and along the looped reservoir 16 in that it travels along an entirety of one of the chambers before looping back on itself at end portion. 24. Ends 26 of the conductor 20 project out of the looped reservoir 16 to form terminals therefor. The ferro-magnetic medium 18 (core) and conductor 20 so arranged form an inductor that opposes changes in magnitude of current flowing through the conductor 20. When a magnitude of current flowing through the conductor 20 changes, the corresponding time-varying magnetic field induces an electromotive force in the conductor 20, which can be described by Faraday's law of induction. And according to Lenz's law, the induced voltage has a polarity (direction) which opposes the change in current that created it. As a result, the so-formed inductor opposes any change in current flowing therethrough.

In this example, the power electronic elements 14 are shown schematically as a single block. These elements, however, may of course take different shape and could be distributed throughout the housing (e.g., switches in. one location of the housing, a capacitor in another location of the housing, etc.) The looped reservoir 16 could thus be formed as a serpentine chamber (or chambers) that winds its way through the housing 12 and around the various power electronic elements to occupy available space between the housing 12 and the various power electronic elements.

Figure 2A:
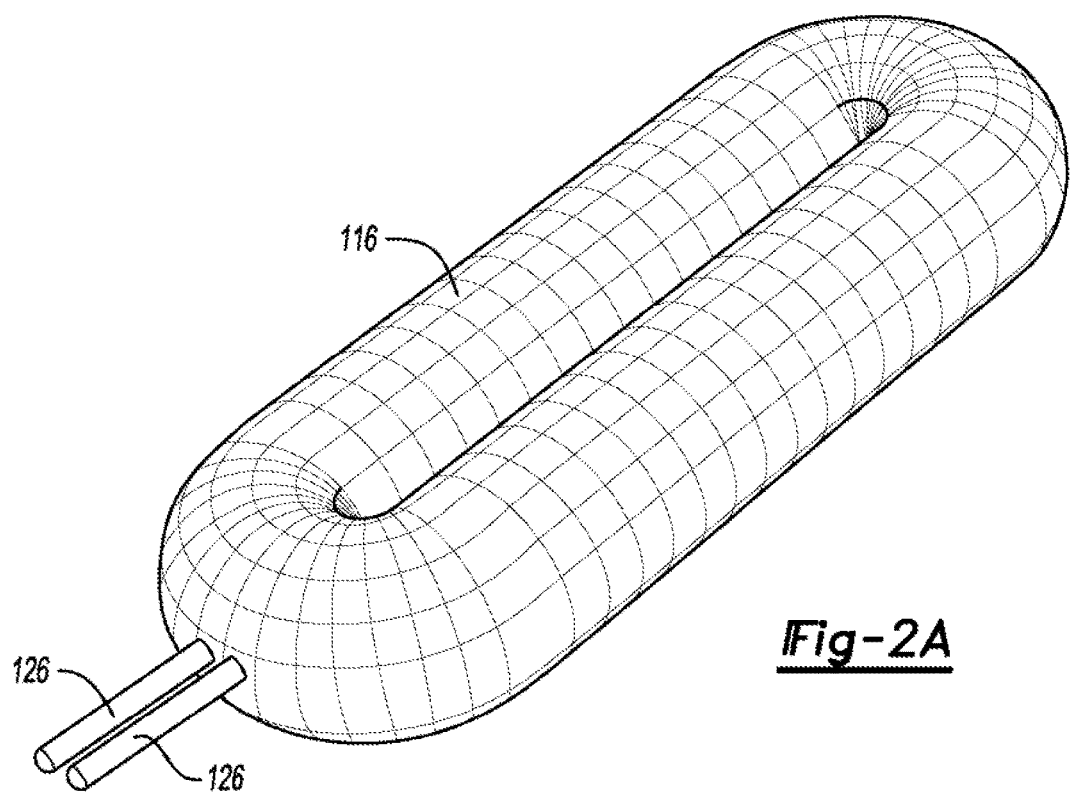
FIG. 2A is a perspective view of an inductor.
Figure 2B:
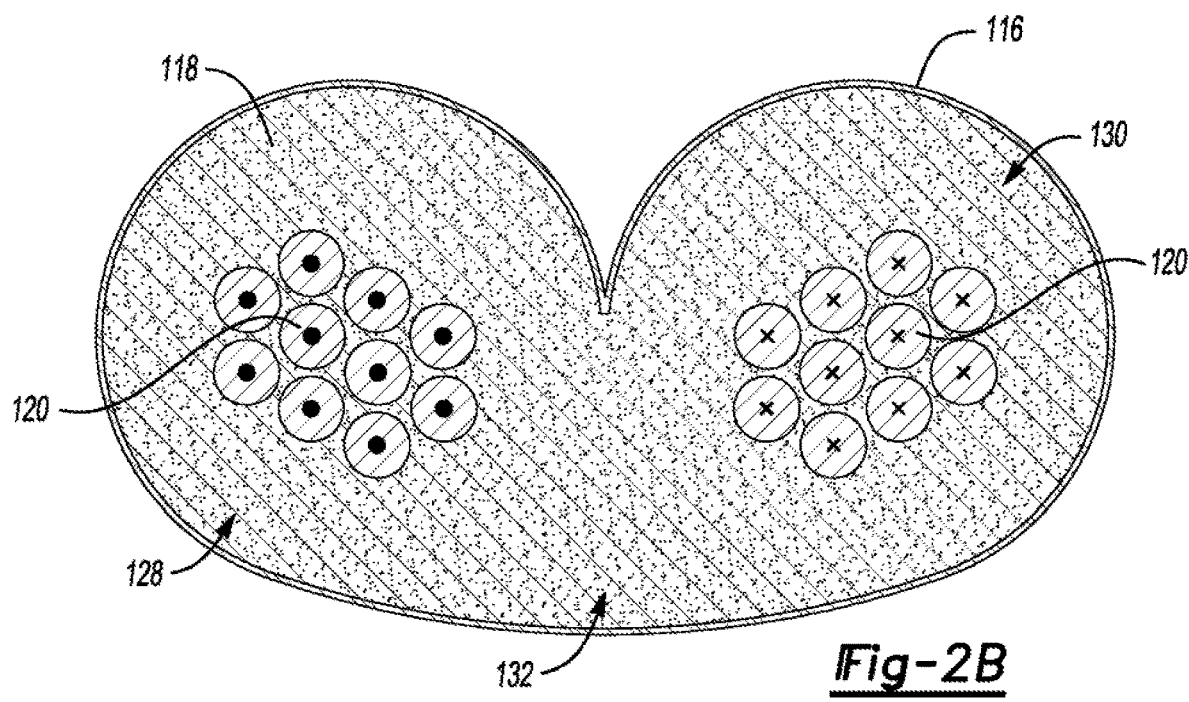
FIG. 2B is an end view, in cross-section of the inductor of FIG. 2A.
Figure 2C:
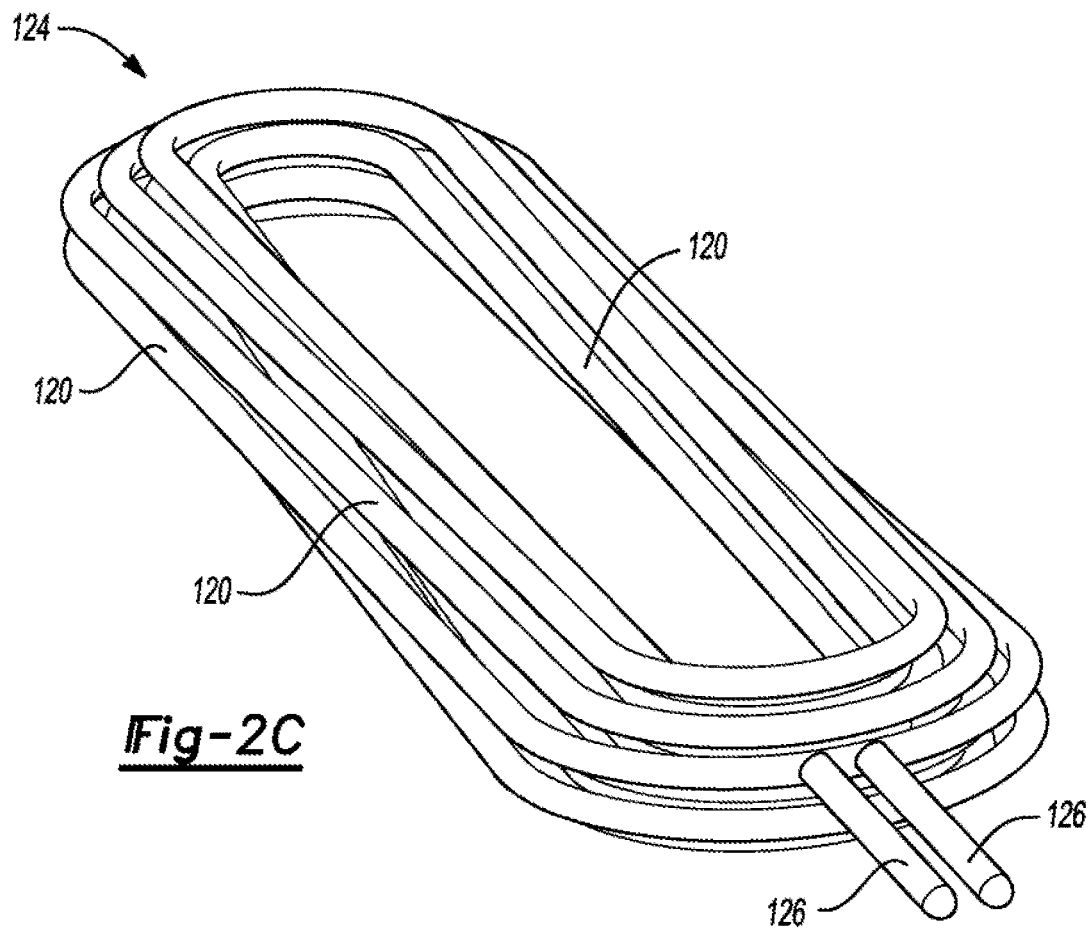
FIG. 2C is a perspective view of a portion of the inductor of FIG. 2A.

FIGS. 2A, 2B, and 2C show another example of a looped reservoir 116. (Similarly numbered elements may share similar description.) As suggested above, the looped reservoir 116 can be formed integrally with a housing of a power-electronic module or separate therefrom as its own component. The looped reservoir 116 includes a ferromagnetic medium 118 (e.g., a ferro-magnetic fluid, a ferromagnetic foam, a ferro-magnetic gel, a ferro-magnetic powder, etc.) sealed therein and one or more conductors 120 (e.g., wires) surrounded by the ferro-magnetic medium 118. The looped reservoir 116, in this example, has a toroidal-like shape defining two partial chambers 128, 130. Unlike the example of FIGS. 1A and 1B, however, the partial chambers 128, 130 share a common region 132. Other shapes are of course contemplated.

The one or more conductors 120 are wound around the toroid, within the partial chambers 128, 130, and folds back at end portion 124 to provide anti-parallel current flow, resulting in conflicting changing magnetic fields throughout the core, mitigating the circuit's magnetic field effect. Ends 126 of the one or more conductors 120 project out of the looped reservoir 16 to form terminals therefor.

Ferro-magnetic mediums, as mentioned above, can be fluids, foams, gels, powders, etc. As such, the corresponding reservoirs should provide sufficient sealing using known techniques to contain these media. If a liquid is used, the reservoir should be liquid tight. If a particle is used, the reservoir should he particle tight, and so on.

Figure 3:
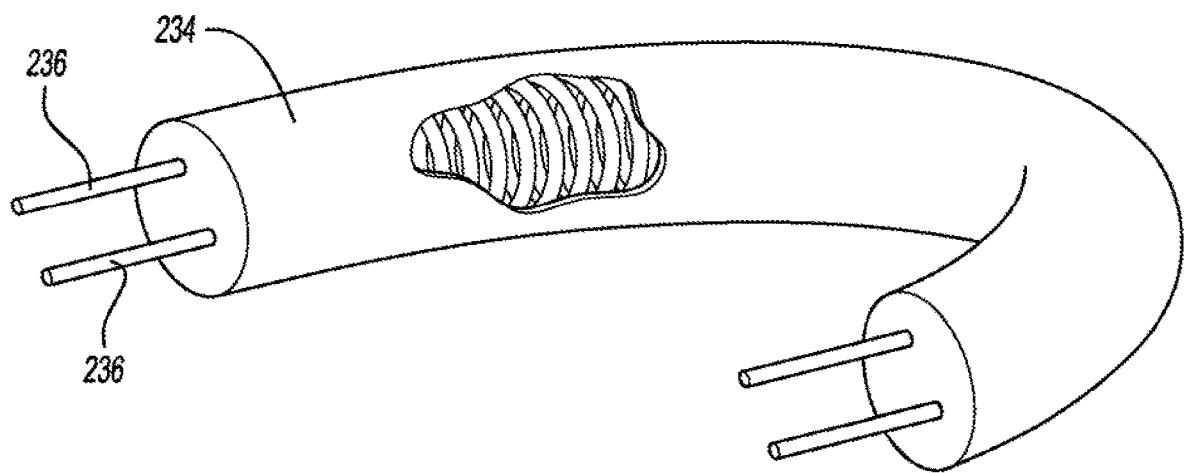
FIG. 3 is a perspective view of a portion of a flexible inductor.

Certain examples thus far have suggested that a reservoir containing a conductor and a Ferro-magnetic medium can form an inductor within an automotive power-electronic module that can. be strategically packaged within otherwise unused spaces. FIG. 3 shows an alternative in which a flexible core 234 has conductors 236 coiled and/passing therethrough. The flexible core 234 may be a polymer cord with Ferro-magnetic components such as ferro-magnetic particles distributed/doped throughout. The flexible core 234 may also he formed as a mixture of polymers/resins and ferro-magnetic foams/gels, etc. Given the pliability of the flexible core 234, the inductor may be strung or woven through available packaging space within an automotive power-electronic module. Referring to FIG. 1A, for example, the inductor of FIG. 3 may be strung in a serpentine fashion around the power electronic elements 14 to occupy the space between the housing 12 and power electronic elements 14. (Thus, the looped reservoir 16 and its associated components schematically represent the inductor of FIG. 3.) That is, packaging space within an automotive power-electronic module need not be specifically set aside to accommodate passive inductive elements. Instead, configurations contemplated herein may be arranged within space that is already available.

Figure 4:
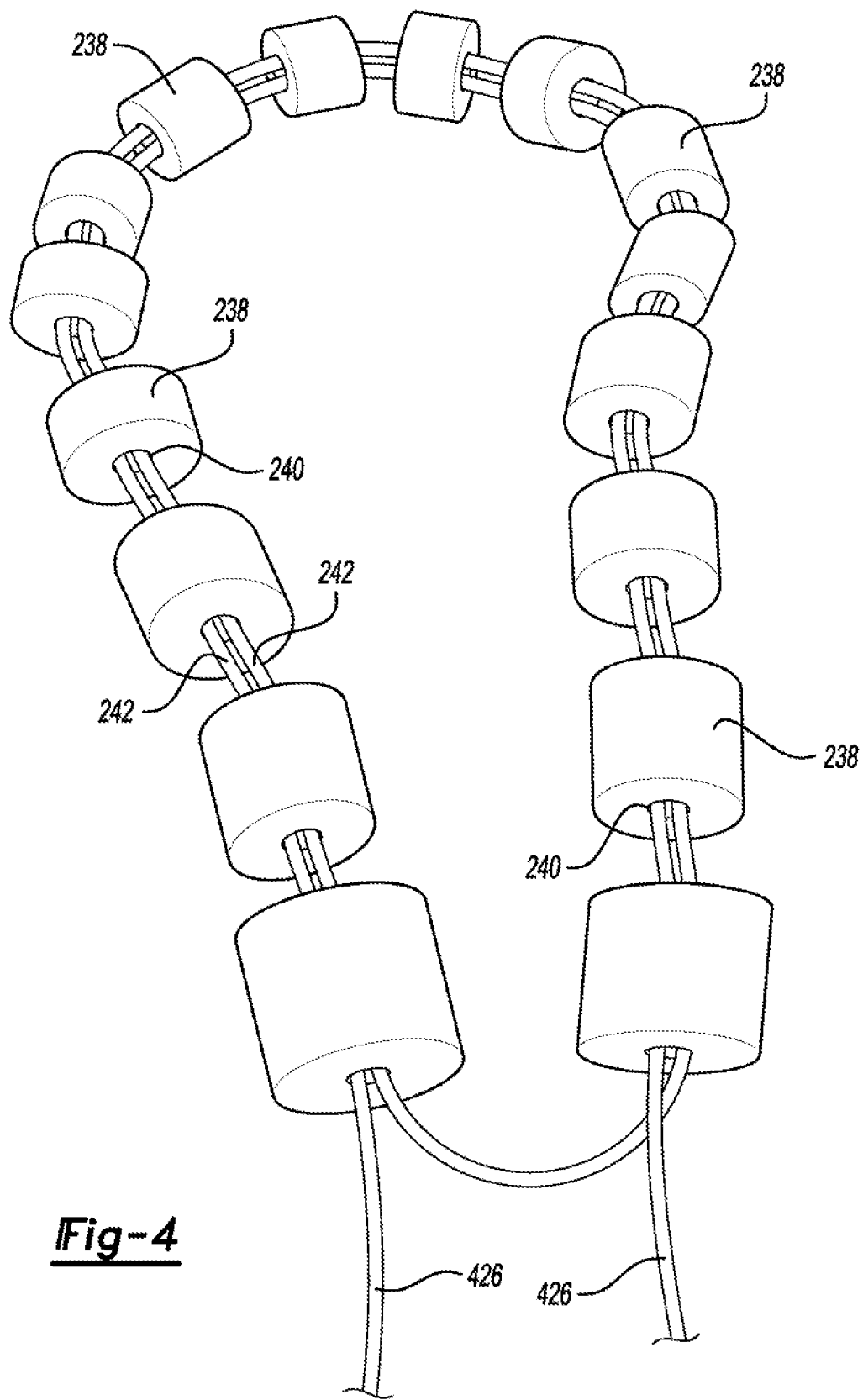
FIG. 4. is a perspective view of a necklace-like inductor.

Instead of having a continuous core, FIG. 4 shows discrete bead-like core elements 238. with bores 240 therethrough, that are strung on multiple passes of a conductor 242 to form a necklace-like inductor. In the example of FIG. 4. each bead-like core element 238 has only a single bore 240 to accommodate the multiple passes of the conductor 242. Core elements in other examples, however, may have multiples bores/holes to accommodate each pass of a same conductor or multiple conductors. Also, while the core elements 238 in this example have cylindrical shape, other shapes (spherical, triangular, cubical, etc.) are possible. Moreover, the size of the core elements 238 can be selected for their particular application. As such, some of the core elements 238 may be larger than others: Portions of the necklace-like inductor to be strung in portions of an automotive power-electronic module with more available space can have larger core elements, and portions of the necklace-like inductor to be strung in portions of the automotive power-electronic module with less available space can have smaller core elements, etc.

Referring again to FIG. 1A, the inductor of FIG. 4 may be strung in a serpentine fashion around the power electronic elements 14 to occupy the space between the housing 12 and power electronic elements 14. (Thus, the looped reservoir 16 and its associated components schematically represent the inductor of FIG. 4.)

The words used in the specification are words of description rather than limitation, and it is understood that various changes may be made without departing from the spirit and scope of the disclosure and claims. As previously described, the features of various embodiments may be combined to form further embodiments that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A power system comprising:
a power-electronic module including a housing defining a looped reservoir, a ferro-magnetic medium sealed within and filling the looped reservoir, and a conductor surrounded by the ferro-magnetic medium, coiled within and along the looped reservoir, and having terminals extending out of the reservoir such that the ferro-magnetic medium and conductor form an inductor that opposes changes in magnitude of current flowing through the conductor.

2. The power system of claim 1, wherein the power-electronic module is an automotive DC to DC converter, wherein the automotive DC to DC converter includes switches contained within the housing, and wherein the looped reservoir wraps around the switches.

3. The power system of claim 2, wherein the ferro-magnetic medium is a fluid.

4. The power system of claim 2, wherein. the ferro-magnetic medium is a foam.

5. The power system of claim 2, wherein the ferro-magnetic medium is a gel.

6. The power system of claim 2, wherein the ferro-magnetic medium is a powder.

7. The power system of claim 1, wherein the looped reservoir occupies corner regions of the housing.

8. The power system of claim 1, wherein the housing is composed of non-ferromagnetic material.

9. The power system of claim 8, wherein the non-ferromagnetic material includes epoxy or plastic.

10. A power system comprising:
   a power-electronic module including a housing, switches contained by and spaced away from the housing, and a serpentine polymer cord strung within the housing and around the switches, wherein the polymer cord includes a ferro-magnetic medium distributed throughout and a pair of conductors passing therethrough such that the ferro-magnetic medium and conductors form an inductor that opposes changes in magnitude of current flowing through the conductors.

11. The power system of claim 10, wherein the power-electronic module is an automotive DC to DC converter.

12. The power system of claim 10, wherein the ferro-magnetic medium is ferro-magnetic foam.

13. The power system of claim 10, wherein the ferro-magnetic medium is ferro-magnetic powder.

14. The power system of claim 10, wherein the ferro-magnetic medium is ferro-magnetic gel.

15. A power system comprising:
   a power-electronic module including a housing, switches contained by and spaced away from the housing, and a necklace strung within the housing and around the switches, wherein the necklace includes a plurality of discrete bead-core elements having bores therethrough and one or more conductors passing through the bores to form an inductor that opposes changes in magnitude of current flowing through the conductors.

16. The power system of claim 15, wherein some of the bead-core elements have a size different than other of the bead-core elements.

17. The power system of claim 15, wherein the bead-core elements have cylindrical shape.

18. The power system of claim 15, wherein each of the bead-core elements has only a single bore.

19. The power system of claim 18, wherein the conductors are wires.

* * * * *